(12) United States Patent
Ferreyra et al.

(10) Patent No.: US 10,603,583 B1
(45) Date of Patent: Mar. 31, 2020

(54) ENTITY-COMPONENT ARCHITECTURE WITH COMPONENTS HAVING MULTIPLE CONFIGURATIONS

(71) Applicant: Amazon Technologies, Inc., Seattle, WA (US)

(72) Inventors: Juan Pablo Ferreyra, Lake Forest, CA (US); Pablo Puo Hen Cheng, Pomona, CA (US); Brian David Fisher, Irvine, CA (US); Bill L. Merrill, Foothill Ranch, CA (US)

(73) Assignee: Amazon Technologies, Inc., Seattle, WA (US)

( * ) Notice: Subject to any disclaimer, the term of this patent is extended or adjusted under 35 U.S.C. 154(b) by 319 days.

(21) Appl. No.: 15/270,037

(22) Filed: Sep. 20, 2016

(51) Int. Cl.
*A63F 13/352* (2014.01)
*H04L 29/06* (2006.01)
*A63F 13/77* (2014.01)
*A63F 13/335* (2014.01)

(52) U.S. Cl.
CPC .......... *A63F 13/352* (2014.09); *A63F 13/335* (2014.09); *A63F 13/77* (2014.09); *H04L 67/42* (2013.01)

(58) Field of Classification Search
None
See application file for complete search history.

(56) References Cited

U.S. PATENT DOCUMENTS

| | | |
|---|---|---|
| 2003/0064808 A1 | 4/2003 | Hecht et al. |
| 2004/0148221 A1 | 7/2004 | Chu |
| 2011/0136577 A1 | 6/2011 | Dietz et al. |
| 2011/0320520 A1 | 12/2011 | Jain et al. |
| 2013/0316828 A1 | 11/2013 | Ur et al. |
| 2014/0274379 A1* | 9/2014 | Justice ............... A63F 13/12 463/31 |
| 2014/0274384 A1 | 9/2014 | Boswell et al. |
| 2014/0298318 A1 | 10/2014 | Ahn et al. |
| 2016/0274890 A1 | 9/2016 | Sternfeld et al. |

OTHER PUBLICATIONS

U.S. Appl. No. 15/270,046, filed Sep. 20, 2016, Ferreyra et al.

* cited by examiner

*Primary Examiner* — James S. McClellan
*Assistant Examiner* — Peter J Iannuzzi
(74) *Attorney, Agent, or Firm* — BakerHostetler

(57) ABSTRACT

Techniques for implementation of an entity-component architecture with components having multiple configurations are described herein. In some examples, at least one component within an entity-component architecture of a video game may have multiple different configurations. Each of the multiple configurations may, for example, relate to a different respective deployment context in which the configuration will be deployed. For example, in some cases, the different configurations may be defined for different device types, such as client, server, and others. Additionally, in some cases, the different configurations may be defined for different types of game consoles, and other different software, hardware, and/or contextual attributes. Furthermore, in some cases, configurations may be defined for use during video game development, such as within an editing interface that is used for video game development.

20 Claims, 9 Drawing Sheets

ENTITY-COMPONENT ARCHITECTURE WITH COMPONENTS HAVING MULTIPLE CONFIGURATIONS

BACKGROUND

The popularity and widespread use of video games has increased dramatically in recent years. A common architecture that is used for development of video games is an entity-component architecture, which may also be commonly referred to as an entity-component system. Such an architecture or system may include entities that may represent objects within a virtual space of a video game, such as characters, weapons, animals, structures, and the like. Each such entity may include one or more components that may represent aspects of the entity. For example, a wolf entity may be defined within a video game context, and the wolf entity may include components such as a mesh render component, an animation component, an artificial intelligence (AI) component, a health component, and others. The behavior of an entity may be changed, for example, by adding and removing components. An entity-component architecture may be advantageous because it may provide an efficient and intuitive model for defining and organizing video game objects. However, the entity-component architecture may also involve a number of drawbacks. For example, it may often be desirable for a single component to behave differently depending upon various factors, such as a type of device on which the component executes (e.g., server, client, editor, game console, etc.). However, in conventional entity-component architectures, an approach may be employed in which an identical component with identical functionality may be deployed to all devices, irrespective of their different operational contexts. This approach may sometimes reduce the efficiency, reliability, and security of a component when it executes within these different operational contexts.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
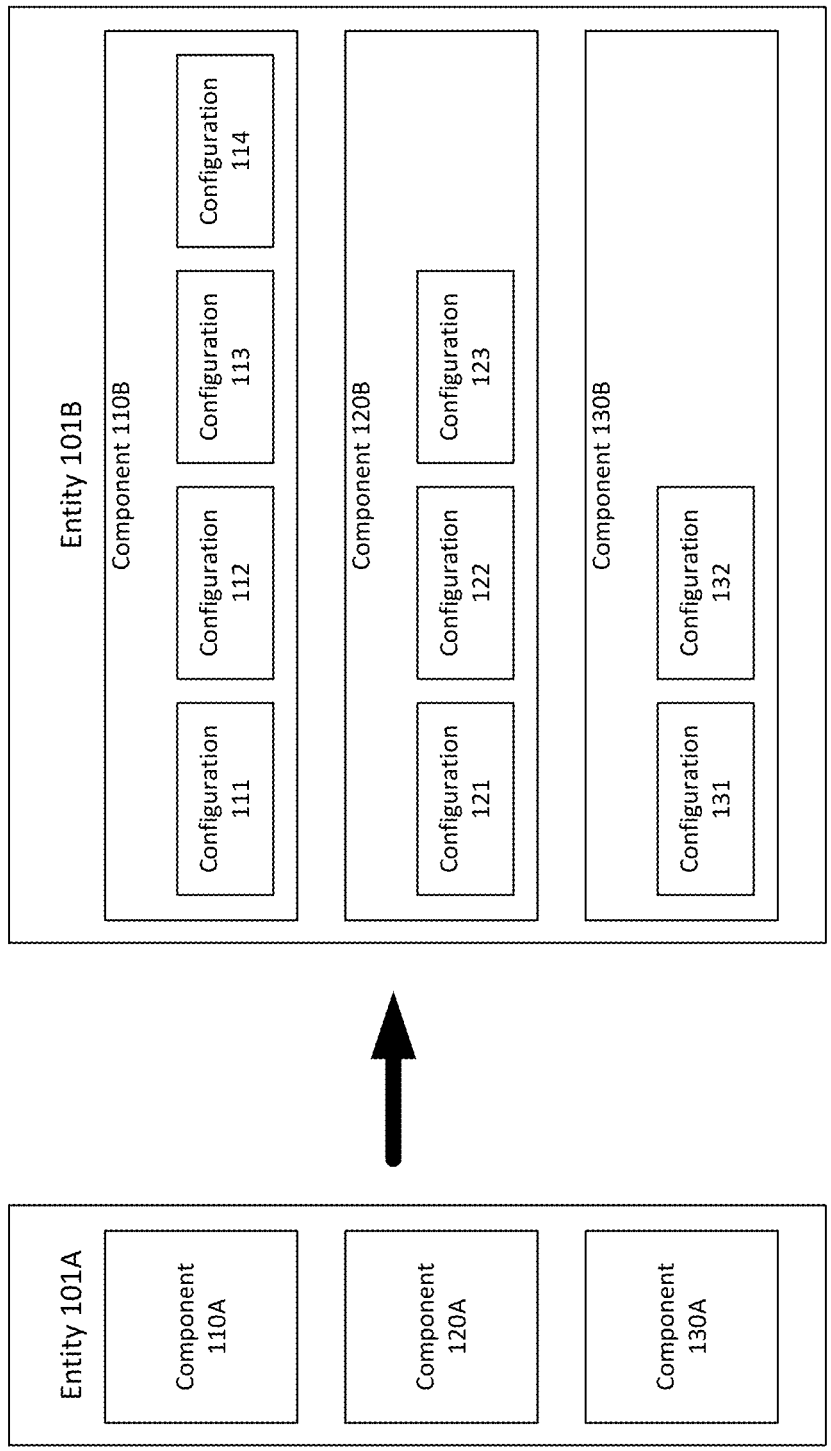
FIG. 1 is a diagram illustrating an example entity without multiple configuration components and an example entity with multiple configuration components.

Techniques for implementation of an entity-component architecture with components having multiple configurations are described herein. As described above, an entity-component architecture is an architecture that may be commonly used for development of video games. The architecture may include entities that may represent objects within a virtual space of a video game, such as characters, weapons, animals, structures, and the like. Each such entity may include one or more components that may represent aspects of the entity. For example, a particular character within a video game may have a respective entity that may include components such as a mesh render component, a health component, an inventory component, and many others. As also described above, in some examples, the behavior of an entity may be changed, for example, by adding and removing components. An entity-component architecture may be advantageous because it may provide an efficient and intuitive model for defining and organizing video game objects.

In some examples, the techniques described herein may allow at least one component within an entity-component architecture of a video game to have multiple different configurations. Each of the multiple configurations may, for example, relate to a different respective deployment context in which the configuration will be deployed. For example, in some cases, the different configurations may be defined for different device types, such as client, server, and others. Additionally, in some cases, the different configurations may be defined for different types of game consoles, different operating systems, and other different software, hardware, and/or contextual attributes (e.g., different screen resolutions, different processor and/or memory resources, different player quantities, and many others). Furthermore, in some cases, configurations may be defined for use during video game development, such as within an editing interface that is used for video game development.

In some examples, a configuration definition for a component may be included, for example in a source video game program from which one or more deployed video game programs may be built and deployed. The configuration definition may define multiple different configurations for a respective component. In some examples, the configuration definition may include a common portion that includes instructions for performing operations that are common to each of the multiple different configurations of the component. Additionally, in some examples, the configuration definition may include multiple specialized portions that each includes instructions for performing specialized operations for a respective one of the multiple different configurations of the component. For example, in some cases, a configuration definition may include a common portion, a specialized server portion for performing specialized operations for deployment on server devices, and a specialized client portion for performing specialized operations for deployment on client devices. As another example, another configuration definition may include a common portion, a specialized first game console portion for performing specialized operations for deployment on a first type of game console, and a specialized second game console portion for performing specialized operations for deployment on a second type of game console.

In some examples, when a deployable video game program is being built for deployment in a particular context, one or more build components may generate the deployable video game program based on a source video game program. In some cases, as part of this process, the build components may examine the source video game program to identify, within the source video game program, a configuration definition that defines multiple different configurations for a respective component. The build components may then include, within the deployable video game program, a particular configuration of the configuration definition that corresponds to the context in which the deployable video game program will be deployed. The particular configuration that is included in the deployable video game program may include the common portion of the configuration definition as well as a specialized portion of the configuration definition that corresponds to the context of the deployable video game program. For example, for a video game program that will be deployed on a server, the video game program may be built to include a server component configuration that includes the common portion of the configuration definition as well as a specialized server portion of the configuration definition. As another example, for a video game program that will be deployed on a client, the video game program may be built to include a client component configuration that includes the common portion of the configuration definition as well as a specialized client portion of the configuration definition.

The use of multiple different component configurations may provide a number of advantages. For example, in some cases, multiple different component configurations may allow components within a video game to be easily extended to new contexts, for example by simply generating new configurations for the new contexts. Also, the multiple different component configurations may be exposable in a video game editing interface used to develop a video game, thereby simplifying the component configuration process and improving efficiency. Additionally, in some cases, multiple different component configurations may improve organization and workflow, for example by allowing encapsulation of asymmetric representations of a component for different contexts while also clearly defining the reach of the component to programmers and others. Furthermore, in some cases, multiple different component configurations may reduce or eliminate the need to use other less efficient techniques, such as macros, pre-programming techniques, and others. Moreover, in some cases, multiple different component configurations may reduce or eliminate the need for a component to employ an external network binding component, which may often be generated by a different author who is not sufficiently familiar with the operational scope of the component. For these and other reasons, the use of a network binding component may often lead to inefficiencies and/or defects in the software. By contrast, the use of multiple different component configurations may reduce these risks and improve efficiency and reliability. As yet another example, multiple different component configurations may allow specialized code or other instructions to be stripped away from contexts in which the code is not needed, thereby improving privacy and security.

Referring now to FIG. 1, some example characteristics of a multiple configuration component will now be described in detail. In particular, the example of FIG. 1 depicts an entity 101A, which is a traditional entity without multiple configuration components. The example of FIG. 1 also depicts an entity 101B, which is an example of an entity that includes multiple configuration components. In some examples, entity 101A and/or entity 101B may be included within an entity-component architecture for a video game. In particular, in the example of FIG. 1, entity 101B includes components 110B, 120B and 130C. Component 110B includes four different configurations 111-114. Component 112B includes three different configurations 121-123. Component 130B includes two different configurations 131 and 132.

As set forth above, each of the multiple configurations within a multiple configuration component may relate to a different respective deployment context in which the configuration will be deployed. As a specific example, for component 130B, configuration 131 may be a server configuration for use on one or more servers. By contrast, configuration 132 may be a client configuration for use on one or more clients. As another specific example, for component 120B, configuration 121 may be a first video game console configuration for use on a first type of video game console. Configuration 122 may be a second video game console configuration for use on a second type of video game console. Configuration 123 may be an editor and/or instrumentation configuration for use by a video game editor during video game development. It is noted that the above examples are non-limiting, and that any combination of these or other types of configurations for these or other deployment contexts may be employed.

In contrast to entity 101B, entity 101A includes components 110A, 120A and 130A, which do not include multiple different configurations. Thus, in some examples, all respective instructions (e.g., for all potential deployment contexts) for components 110A, 120A and 130A may each be included in all deployments of a resulting video game. This may result in inefficiencies and/or defects in the video game, for example for reasons such as will be described below.

To illustrate a specific example in which multiple configuration components may be advantageous, consider the scenario in which a particular component represents an inventory of assets (e.g., gold, weapons, tools, etc.) acquired by a player. Now suppose that this particular component is used in a multi-player client-server video game in which a server maintains state and multiple players operate multiple connected clients. In this example, a player's inventory may typically be maintained by the server. For example, the server may have the authority to add and remove items from the player's inventory. By contrast, the clients may not have the authority to add or remove items from the player's inventory. Additionally, different clients may typically be permitted to perform different actions with respect to a player's inventory. In particular, in some examples, clients may be permitted to view items in their respective inventory and to request that items be added and deleted from their respective inventory. However, in some examples, clients may not be able to view or to request that items be added to, or removed from, other players' inventories. For example, Client A operated by Player A may be able to view Player A's inventory and to request that items be added to, and deleted from, Player A's inventory. However, Client A may not be able to view Player B's inventory or to request that items be added to, or removed from, Player B's inventory. Client A may, however, be aware that Player B has an inventory, for example so that Player A may request trades with Player B or otherwise interact with Player B.

In this scenario, when multiple configurations are not used, an identical inventory component may, in some examples, be deployed to both the client and the server programs executing the above described video game. Thus, within this identical inventory component, the clients may be provided with instructions for performing commands and other operations that are only authorized for performance by the server. Additionally, the server may be provided with instructions for performing commands and other operations that are only authorized for performance by the client. As an example, in some cases, the clients may be provided with instructions for adding and removing items to and from player inventories, which are operations that are only authorized for performance by the server. As another example, instructions provided within the component could potentially be used by clients to obtain views of opposing player inventories.

In some examples, external components, such as network binding components, may be employed to help ensure that clients cannot successfully perform operations for which they are not authorized. However, these external components may often not be capable of preventing all unauthorized or erroneous behaviors by different contextual actors. For example, a network binding component may often be created and programmed by a different author than the author that creates and programs the inventory component, and this different author may not fully comprehend or be able to anticipate all of the potential actions and behaviors of the inventory component. Thus, network binding components and other security techniques may be unable to prevent all unauthorized or erroneous actions by components in different contexts, thereby leading to defects and inefficiencies within a video game. Thus, multiple configuration components may sometimes be used without network binding components.

In some examples, the multiple configuration component techniques described herein may help to reduce or eliminate these and other problems. For example, in some cases, the techniques described herein may allow a server configuration of the above identified inventory component to be deployed to server contexts, while a client configuration of the above identified inventory component may be deployed to client contexts. In some examples, the server configuration of the inventory component may include instructions for performing operations such as adding and removing of items from the inventory and for providing views of an inventory to authorized respective clients. By contrast, these server instructions may not be included in the client configurations of the inventory component. Instead, the client configurations may include instructions for requesting adding and removing of items and for requesting views of respective inventories for respective players that control the clients. This may help to ensure that the clients cannot perform server operations for which the clients are not authorized, for example reducing the likelihood that opposing inventories will be improperly viewed or modified by clients.

As another specific example in which multiple configuration components may be advantageous, consider the scenario in which a particular component relates to mesh rendering. Now suppose that the component is being used for a video game that may be played on various different types of game consoles. For example, suppose that the video game may be played on a first type of game console that supports connection to monitors, televisions and other display devices that may vary in size and resolution relative to one another. Additionally, suppose that the video game may also be played on a second type of game console that is built into a hardware device having a fixed display size and resolution. In this example, it may sometimes be advantageous to generate multiple different configurations for the mesh rendering component that relate to the different types of game consoles on which the video game may be deployed. For example, a first configuration for deployment on the first type of game console may include instructions for supporting various different mipmap ranges to support and/or pre-generate, such as may relate to common ranges of screen sizes and resolutions that may be used with the first type of game console. By contrast, because the second type of game console is used with a fixed size and resolution display, a second configuration for deployment on the second game console may include specialized instructions for rendering an asset mesh for that specific display, such as a particular mipmap level, a particular quantity of pixels, particular texture compression levels, and other particular level of detail (LOD) characteristics for that asset. These multiple different configurations may provide efficient and reliable functionality for allowing a single graphical asset that is generated by an artist or developer to be generated differently by different game consoles such that the asset may be displayed in a manner that is particularly suited for a display device used by each game console.

In addition to those described above, another example use of multiple configuration components may be to generate an editor configuration of a component that may be associated with a video game editing interface. The editor configuration may be used during a video game editing process and subsequently discarded at runtime when the video game is eventually executed. In some examples, this may allow the component to expose a complex representation for use during an entity authoring process that may not be efficient for use during game execution. For example, an editor configuration of a component may enable comments and other information that may be useful during entity authoring to be efficiently and reliably stripped away for runtime. It is noted that the above examples of multiple configuration components are non-limiting and that many different types of multiple configuration components with different characteristics may be employed for different types of game consoles, servers, clients, editors, hardware, software, and/or other deployment contexts. For example, in some cases, different configurations may be defined based, at least in part, on different operating systems, different processor and/or memory resources, contexts associated with different player quantities, different skill levels, and many others.

Figure 2:
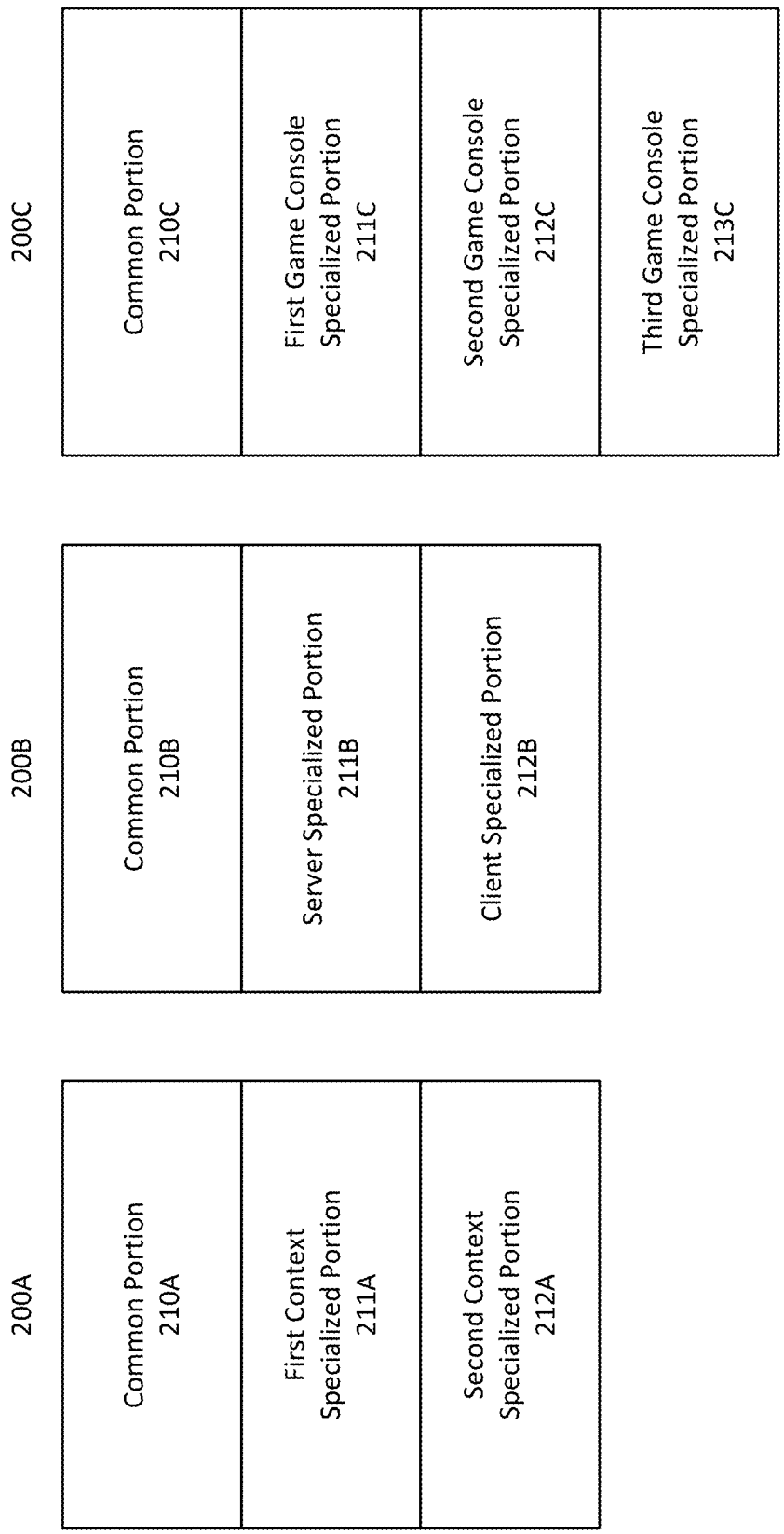
FIG. 2 is a diagram illustrating example configuration definitions that may be used in accordance with the present disclosure.

In some examples, each of the multiple configurations for a component (e.g., client, server, game console type, editor-only, etc.) may be exposed in a video game editing interface (or other development interface) used to develop a video game, for example to game developers, entity authors, programmers, and others. This may assist in enabling a more clearly defined organization of component functionality, thereby improving workflow, efficiency and reliability. For example, in some cases, a video game that is being developed may include a configuration definition that defines multiple different configurations. In some examples, the configuration definition may include a common portion that includes instructions for performing operations that are common to each of the multiple different configurations of the component. Additionally, in some examples, the configuration definition may include multiple specialized portions that each includes instructions for performing specialized operations for a respective one of the different configurations of the component. Referring now to FIG. 2, some example configuration definitions will now be described in detail. In particular, FIG. 2 includes three example configuration definitions 200A, 200B and 200C. Specifically, configuration definition 200A includes a common portion 210A, a first context specialized portion 211A, and a second context specialized portion 212A. Configuration definition 200A is intended to provide a general example in which the different contexts of specialized portions 211A and 212A are not specifically indicated in FIG. 2. By contrast, configuration definitions 200B and 200C provide more specific examples in which the contexts of the specialized portions are specifically indicated. In particular, configuration definition 200B includes a common portion 210B, a server specialized portion 211B for deployment to one or more servers, and a client specialized portion 212B for deployment to one or more clients. As another specific example, configuration definition 200C includes a common portion 210C, a first game console specialized portion 211C for deployment to a first type of game console, a second game console specialized portion 212C for deployment to a second type of game console, and a third game console specialized portion 213C for deployment to a third type of game console.

The exposure of the above described and other configuration definitions with common and specialized portions within an editing and development interface may provide a number of advantages. For example, in some cases, a component may be extended to new contexts by simply adding, to the configuration definition, a new specialized portion of the component that includes functionality for that context. By contrast, existing contexts may be removed by simply removing, from the configuration definition, a specialized portion of the component that includes functionality for that context. Additionally, organization and exposure of configuration definitions in this manner may allow entity authors, programmers, and developers to easily identify and navigate to different contexts for editing. Thus, for example, common functionality that is used by all contexts may be generated and edited only a single time, for example via a common portion of a configuration definition, and then applied universally to all contexts. By contrast, specialized portions of a configuration definition may be easily identified, thereby enabling efficient generation and editing of instructions that apply to individual contexts. It is noted that, in some examples, a configuration definition may include only a single specialized portion including instructions for performing specialized operations for a respective one of the plurality of configurations. Thus, in some examples, a configuration definition may include at least one specialized portion each including instructions for performing specialized operations for a respective one of the plurality of configurations.

Figure 3A:
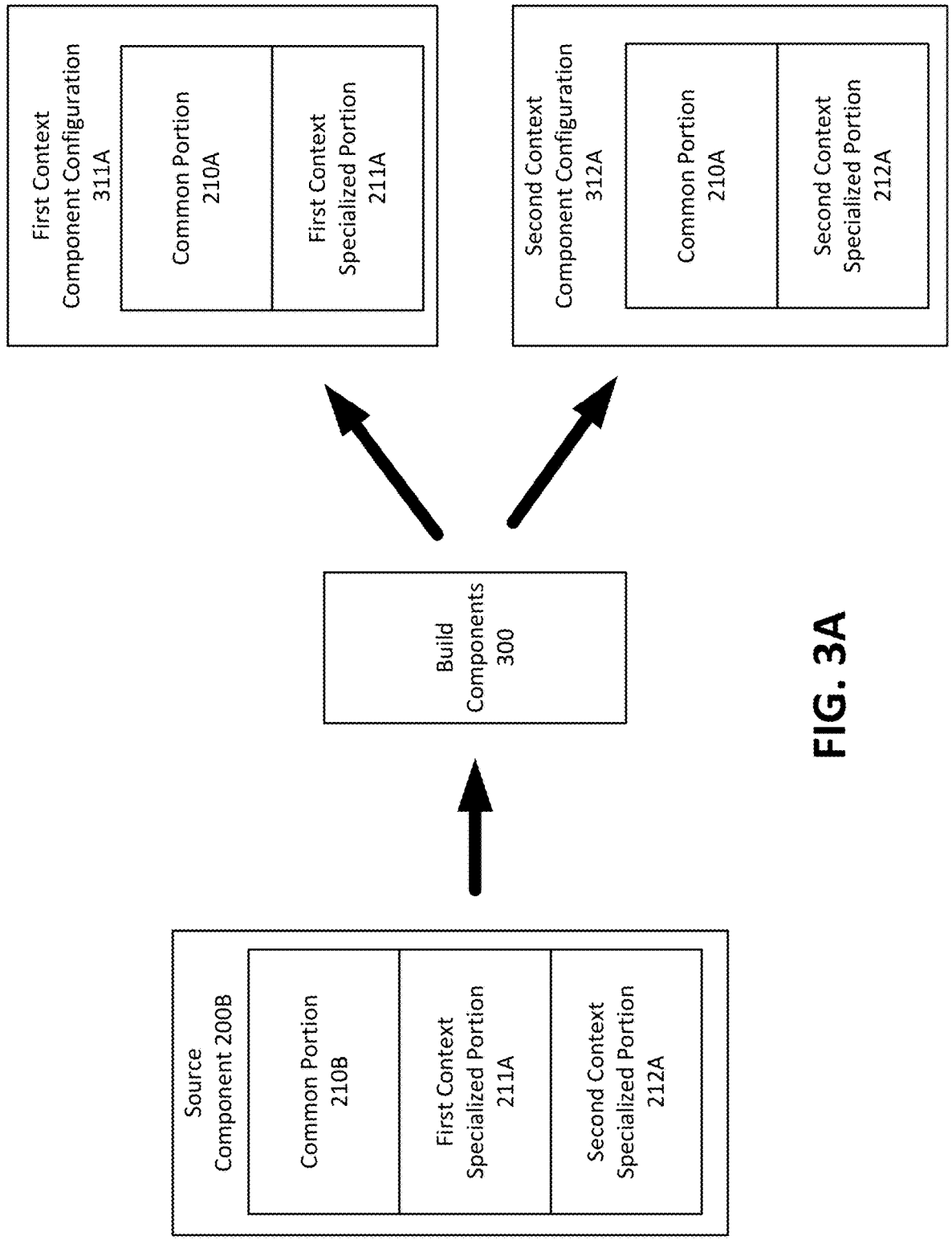
FIGS. 3A and 3B are diagrams illustrating example build processes for multiple different component configurations that may be used in accordance with the present disclosure.

As set forth above, in some examples, when a deployable video game program is being built for deployment in a particular context, one or more build components may generate the deployable video game program based on a source video game program. In some cases, as part of this process, the build components may examine the source video game program to identify, within the source video game program, a configuration definition that defines multiple different configurations for a component. The build components may then include, within the deployable video game program, a particular configuration of the configuration definition that corresponds to the context in which the deployable video game program will be deployed. Referring now to FIG. 3A, an example build process for multiple different component configurations will now be described in detail. As shown in FIG. 3A, configuration definition 200A includes a common portion 210A, a first context specialized portion 211A, and a second context specialized portion 212A. Configuration definition 200A may be included, for example, in a source video game program from which various different deployable video game programs may be generated for deployment in various different deployment contexts. In particular, during a build process, build components 300 may generate these deployable video game programs from the source video game program. Specifically, in the example of FIG. 3A, build components 300 generate a first deployable video game program for a first deployment context that includes a first context component configuration 311A for configuration definition 200A. Additionally, build components 300 generate a second deployable video game program for a second deployment context that includes a second context component configuration 312A for configuration definition 200A. As shown in FIG. 3A, first context component configuration 311A includes common portion 210A and first context specialized portion 211A from configuration definition 200A. Second context specialized portion 212A is not included in first context component configuration 311A. By contrast, second context component configuration 312A includes common portion 210A and second context specialized portion 212A from configuration definition 200A. First context specialized portion 211A is not included in second context component configuration 312A.

Figure 3B:
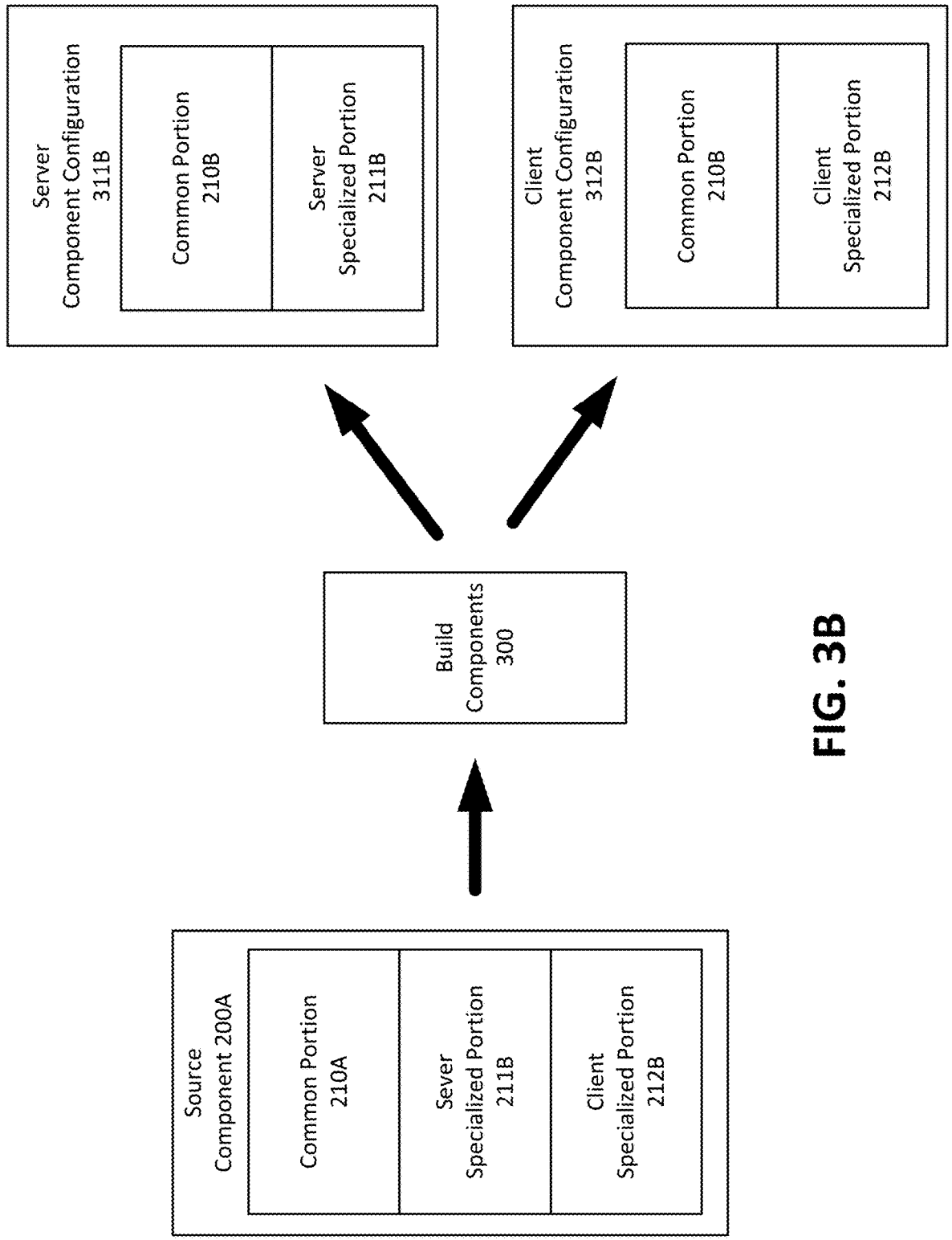

FIG. 3A is intended to provide a general example in which the different contexts of specialized portions 211A and 212A are not specifically indicated. By contrast, FIG. 3B provides a more specific example in which the contexts of the specialized portions are specifically indicated. Specifically, as shown in FIG. 3B, configuration definition 200B includes a common portion 210B, a server specialized portion 211B, and a client specialized portion 212B. In the example of FIG. 3B, build components 300 generate a deployable video game program for a server deployment context that includes a server component configuration 311B for configuration definition 200B. Additionally, build components 300 generate another deployable video game program for a client deployment context that includes a client component configuration 312B for configuration definition 200B. As shown in FIG. 3B, server component configuration 311B includes common portion 210B and server specialized portion 211B from configuration definition 200B. Client specialized portion 212B is not included in server component configuration 311B. By contrast, client component configuration 312B includes common portion 210B and client specialized portion 212B from configuration definition 200B. Server specialized portion 211B is not included in client component configuration 312B. It is once again noted that FIGS. 3A and 3B are intended as non-limiting examples of different types of component configurations and that many other types of configurations may be employed, such as configurations for different types of game consoles (e.g., as shown in configuration definition 200C of FIG. 2), editor-only configurations, and many others.

Figure 4:
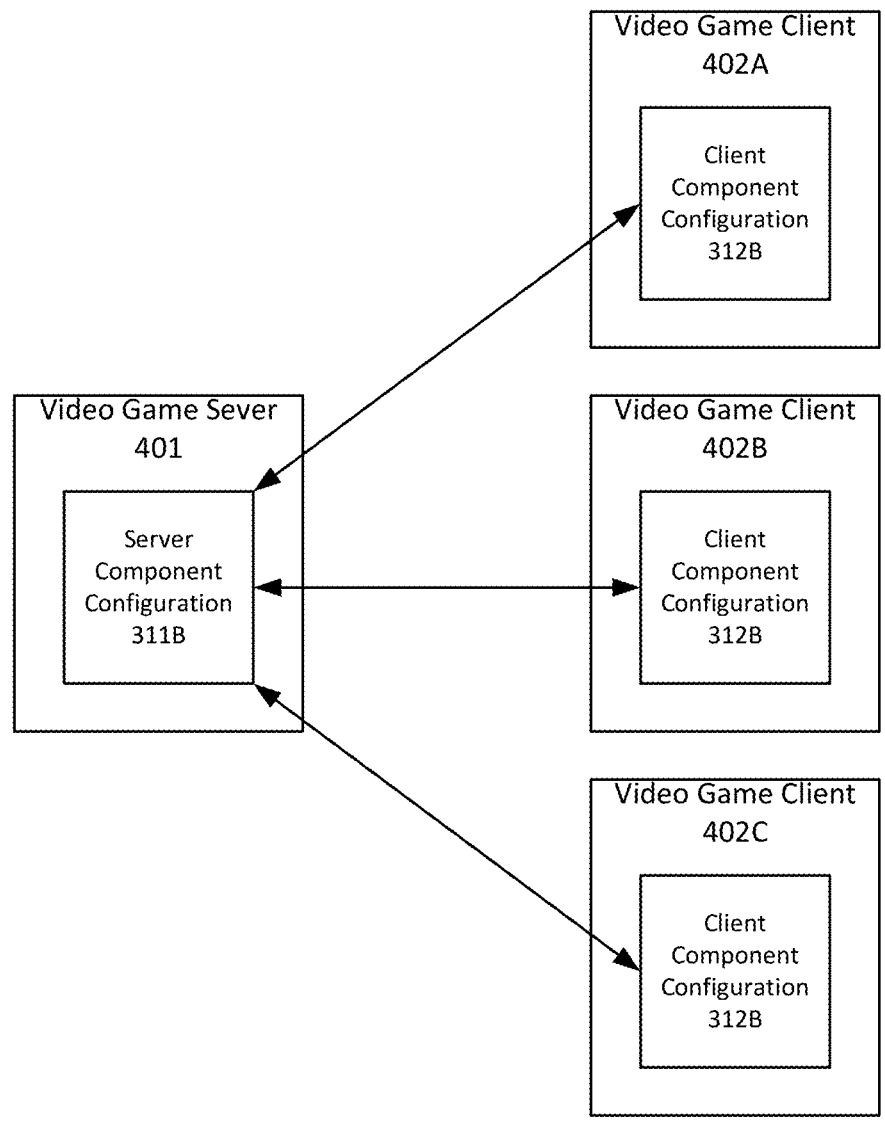
FIG. 4 is a diagram illustrating an example client-server architecture including a component with client and server configurations that may be used in accordance with the present disclosure.

In some examples, a single video game may employ multiple different deployment contexts that each contribute to execution of the video game. For example, in some cases, a multi-player client-server video game may include both server and client contexts with respective server and client component configurations. Referring now to FIG. 4, an example client-server architecture including a component with client and server configurations will now be described in detail. In particular, in the example of FIG. 4, a video game server 401 executes in combination with video game clients 402A-C. As shown in FIG. 4, video game server 401 includes server component configuration 311B (for example generated as shown in FIG. 3B). Additionally, video game clients 402A-C each include client component configuration 312B (for example generated as shown in FIG. 3B).

In some examples, server component configuration 311B may communicate with client component configurations 312B to perform various operations within an executing video game. For example, for the case in which server and client configurations 311B and 312B are for a player inventory component such as described above, server and client component configurations 311B and 312B may communicate to perform various player inventory operations. In particular, in some examples, a video game client 402A may wish to view a respective player inventory for a Player A that operates video game client 402A. In this example, however, the client component configuration 312B may not include instructions for directly accessing Player A's inventory. Rather, the client component configuration 312B at client 402A may issue a request to server component configuration 311B to view Player A's inventory. In this example, server component configuration 311B may include instructions for directly accessing Player A's inventory. Thus, server component configuration 311B may receive the request from client 402A and access Player A's inventory to provide data to client 402A indicating the items that are currently within Player A's inventory. As described in detail above, excluding instructions for directly accessing a player's inventory from client component configuration 312B may eliminate or reduce the risk that these instructions will be (either intentionally or by mistake) misused by clients 402A-C to improperly obtain an unauthorized view of an opposing player's inventory.

As another example, a video game client 402B may wish to remove an item from an inventory for a Player B that operates video game client 402B. In this example, however, the client component configuration 312B may not include instructions for directly removing items from Player B's inventory. Rather, the client component configuration 312B at client 402B may issue a request to server component configuration 311B to remove the item from Player B's inventory. In this example, server component configuration 311B may include instructions for directly accessing Player B's inventory and removing the item. Thus, server component configuration 311B may receive the request from client 402B and access Player B's inventory to remove the item and provide confirmation to client 402B indicating that the item has been removed from Player B's inventory. As described in detail above, excluding instructions for directly removing items from a player's inventory from client component configuration 312B may eliminate or reduce the risk that these instructions will be improperly used by clients 402A-C.

Figure 5:
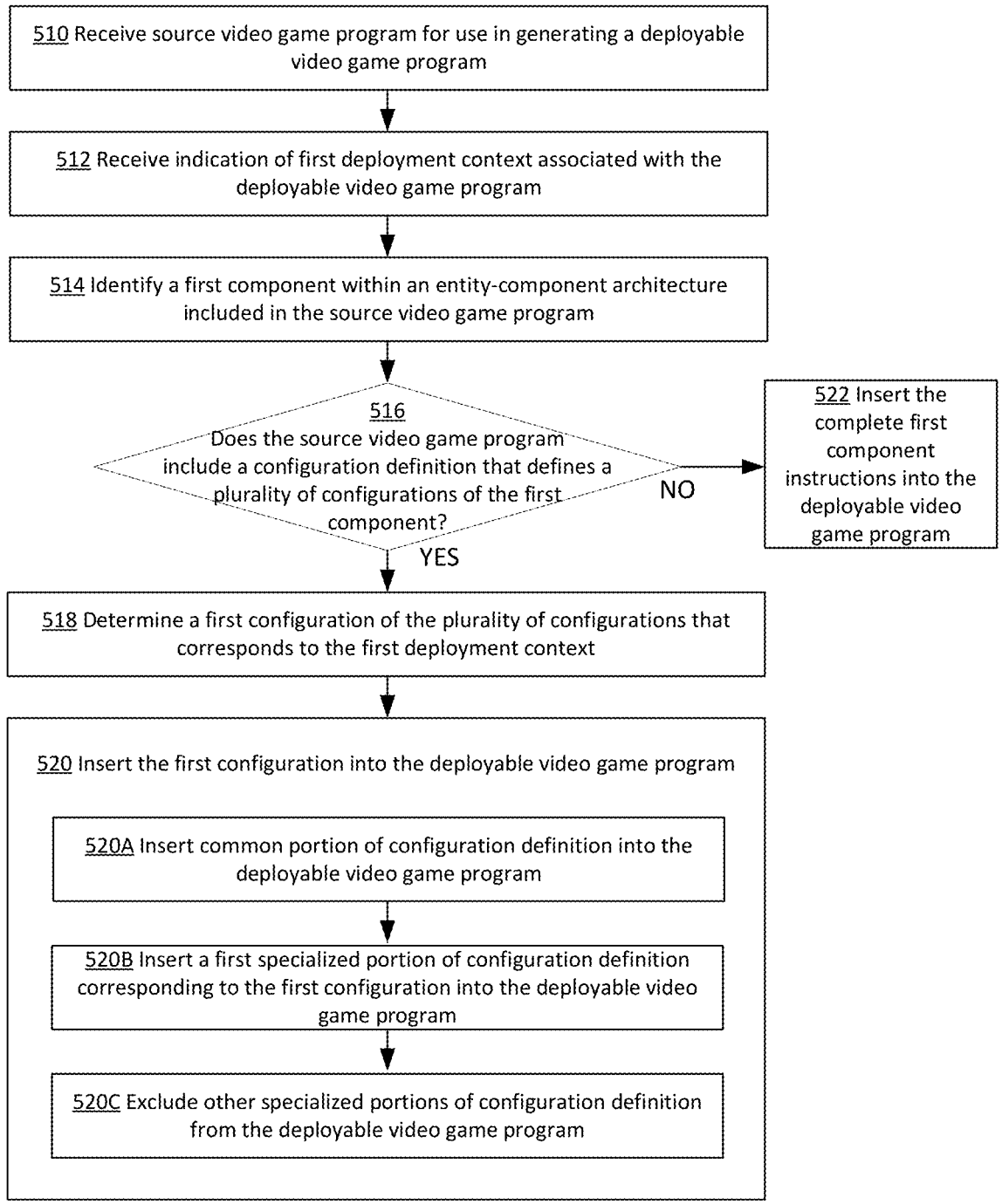
FIG. 5 is a flowchart illustrating an example process for generating a deployable video game program including an entity-component architecture with multiple configuration components that may be used in accordance with the present disclosure.

FIG. 5 is a flowchart illustrating an example process for generating a deployable video game program including an entity-component architecture with multiple configuration components that may be used in accordance with the present disclosure. It is noted that the operations described in FIGS. 5 and 6 and throughout the specification may also be referred to as acts. In some examples, the process of FIG. 5 may be performed by build components 300 of FIGS. 3A-3B and/or other components or devices. As shown, the process of FIG. 5 is initiated at operation 510, at which a source video game program for use in generating a deployable video game program is received, for example by build components 300 of FIGS. 3A-3B. For example, operation 510 may include receiving an indication that the source video game program is ready for deployment and receiving information indicating a location at which the source video game program is stored and/or from which the source video game program may be accessed by build components 300.

At operation 512, an indication of a first deployment context associated with the deployable video game program is received. For example, in some cases, build components 300 may receive instructions to generate, based on the source video game program, a server video game program for deployment on one or more servers. As another example, build components 300 may receive instructions to generate, based on the source video game program, a client video game program for deployment on one or more clients. As another example, build components 300 may receive instructions to generate, based on the source video game program, a particular type of game console video game program for deployment on a particular type of game console. Other types of deployment contexts may include other specialized software, hardware, and/or other architectural contexts.

At operation 514, a first component within an entity-component architecture included in the source video game program is identified. For example, the source video game program may include information that defines an entity-component architecture associated with the respective video game. In some examples, the information may define a plurality of entities, for example representing objects (e.g., characters, weapons, animals, structures, and the like) within a virtual space of a video game. The information may also define, for each such entity, one or more components that may represent aspects of the entity. At operation 514, build components 300 may examine such information to identify a first component within an entity-component architecture included in the source video game program.

At operation 516, it is determined whether the source video game program includes a configuration definition that defines a plurality of configurations for the first component. For example, in some cases, as shown in FIG. 2, a configuration definition may define a plurality of configurations by including a common portion and a plurality of specialized portions. The common portion may include instructions for performing operations that are common to each of the multiple different configurations of the component. The specialized portions may each includes instructions for performing specialized operations for each of the multiple different configurations of the component. For example, in some cases, a configuration definition may include a common portion, a specialized server portion for performing specialized operations for deployment on server devices, and a specialized client portion for performing specialized operations for deployment on client devices. As another example, another configuration definition may include a common portion, a specialized first game console portion for performing specialized operations for deployment on a first type of game console, and a specialized second game console portion for performing specialized operations for deployment on a second type of game console.

If the source video game program does not include a configuration definition that defines a plurality of configurations for the first component, then, at operation 522, the complete first component instructions may be inserted into the deployable video game program. As set forth above, this may be problematic, for example, by potentially allowing deployment contexts to perform operations that they are not authorized to perform, that are not specialized to their specific hardware configurations, or that are otherwise not suited for their particular contexts.

By contrast, if the source video game program does include a configuration definition that defines a plurality of configurations for the first component, then, at operation 518, a first configuration of the plurality of configurations that corresponds to the first deployment context is determined. For example, in some cases, if an indication of a server deployment context was received at operation 512, then a server configuration defined by the configuration definition may be determined to correspond to the server deployment context. As another example, if an indication of a client deployment context was received at operation 512, then a client configuration defined by the configuration definition may be determined to correspond to the client deployment context. As yet another example, if an indication of a particular game console deployment context was received at operation 512, then a configuration for that particular game console defined by the configuration definition may be determined to correspond to the server deployment context. In some examples, one or more identification numbers or other identification or coding systems may be employed to assist in matching deployment contexts to component configurations. For example, a server deployment context could be indicated by an identification number such as 001, and the configuration definition may then indicate the server specialized portion using tags or other identifiers having the identification number 001. As another example, a client deployment context could be indicated by an identification number such as 002, and the configuration definition may then indicate the client specialized portion using tags or other identifiers having the identification number 002.

At operation 520, a first configuration of the first component may be inserted into the deployable video game program. For example, in some cases, operation 520 may include sub-operations 520A-C. In particular, at sub-operation 520A, a common portion of the configuration definition may be inserted into the deployable video game program. At sub-operation 520B, a first specialized portion of the configuration definition corresponding to the first configuration is inserted into the deployable video game program. For example, as shown in FIG. 3B, if the first configuration is a server component configuration 311B, then a server specialized portion 211B may be inserted into the deployable video game program. By contrast, if the first configuration is a client component configuration 312B, then a client specialized portion 212B may be inserted into the deployable video game program. At sub-operation 520C, other specialized portions of the configuration definition (i.e., other than the specialized portion inserted at sub-operation 520B) are excluded from the deployable video game program. For example, as shown in FIG. 3B, if the first configuration is a server component configuration 311B, then a client specialized portion 212B may be excluded from (e.g., not inserted into) the deployable video game program. By contrast, if the first configuration is a client component configuration 312B, then a server specialized portion 211B may be excluded from (e.g., not inserted into) the deployable video game program. As set forth above, including specialized functionality for a related deployment context may improve efficiency, for example by allowing specialized operations for hardware, software, architectural and/or other characteristics to be defined. By contrast, excluding specialized functionality for unrelated deployment contexts may improve privacy, security, and reliability by reducing or eliminating the potential for invocation of unauthorized or otherwise defective operations. As should be appreciated, in some cases, the process of FIG. 5 may be repeated for each component in the entity-component architecture of the video game. Upon generation of the deployable video game program, the deployable video game program may be deployed and executed in its appropriate deployment context, for example on a client, server, game console, or any combinations thereof.

Figure 6:
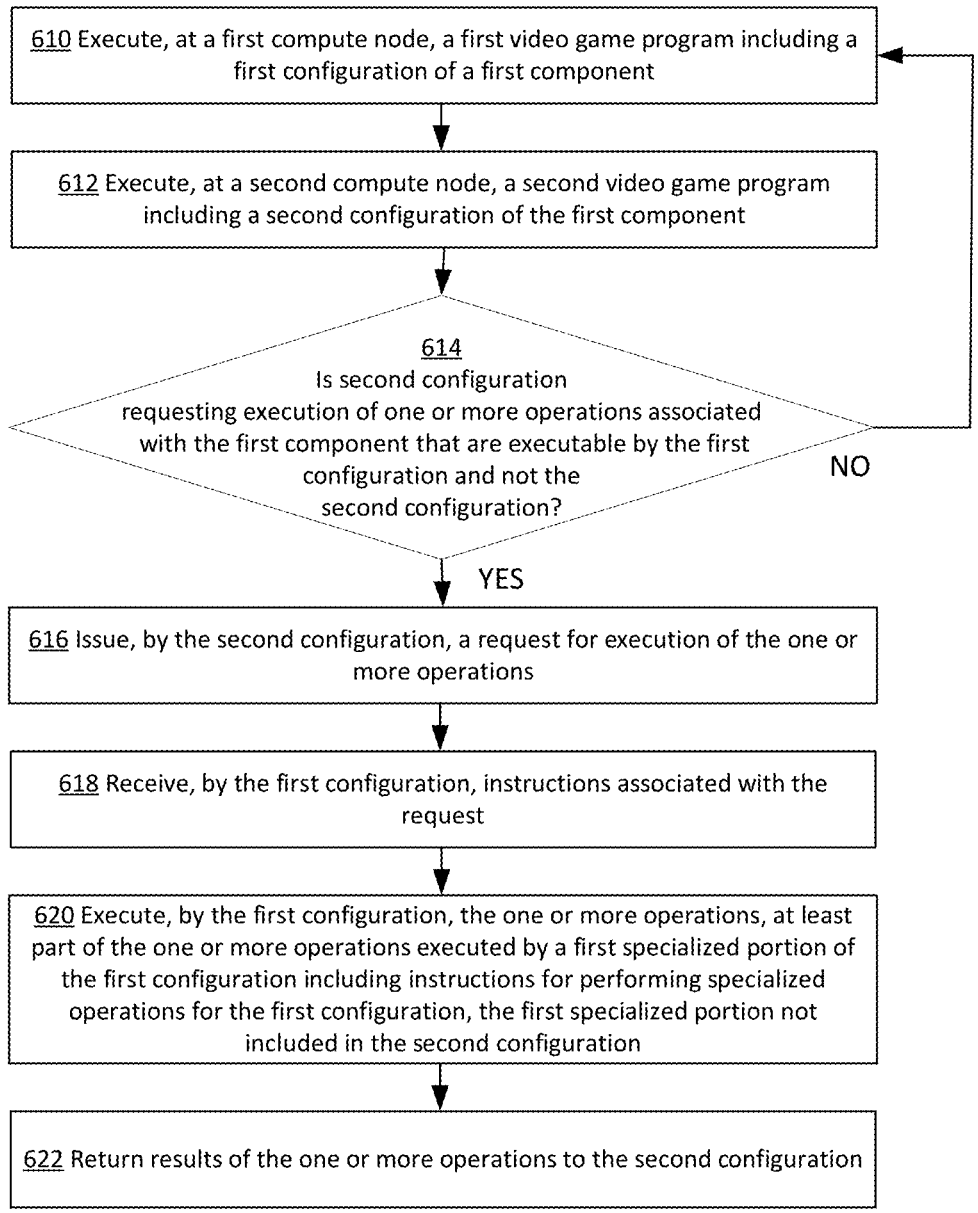
FIG. 6 is a flowchart illustrating an example process for implementing a video game including an entity-component architecture with multiple configuration components that may be used in accordance with the present disclosure.

FIG. 6 is a flowchart illustrating an example process for implementing a video game including an entity-component architecture with multiple configuration components that may be used in accordance with the present disclosure. As shown, the process of FIG. 6 is initiated at operation 610, at which a first video game program including a first configuration of a first component is executed at a first compute node. For example, as shown in FIG. 4, a video game server 401 may be a program that may execute at a server compute node. Video game server 401 includes a server component configuration 311B, such as a server configuration of a player inventory component described in the examples above. At operation 612, a second video game program including a second configuration of the first component is executed at a first compute node. For example, as shown in FIG. 4, each video game client 402A-C may be a program that may execute at a client compute node. Each video game client 402A-C includes a client component configuration 312B, such as a client configuration of the player inventory component described in the examples above. In some examples, a video game may be operated by at least the first video game program and the second video game program. As described above, such as in example process of FIG. 5, the first configuration and the second configuration may be generated based, at least in part, on a configuration definition of the first component.

At operation 614, it is determined whether the second configuration is requesting execution of one or more operations associated with the first component that are executable by the first configuration and not the second configuration. If not, then the process loops back to operation 610. If so, then the process proceeds to operation 616, at which the second configuration issues a request for execution of the one or more operations. As described above, in one particular example, Player B may operate a video game client 402B and may wish to remove an item from his respective player inventory. In this example, however, the client component configuration 312B at video game client 402B may not include instructions for directly removing items from Player B's inventory. Rather, the client component configuration 312B at client 402B may issue a request to server component configuration 311B to remove the item from Player B's inventory. In this example, server component configuration 311B may include instructions for directly accessing Player B's inventory and removing the item.

At operation 618, the first configuration may receive instructions associated with the request. For example, at operation 618, server component configuration 311B may receive instructions associated with the request from video game client 402B to remove an item from Player B's inventory. At operation 620, the first configuration executes the one or more operations. For example, at operation 620, server component configuration 311B may directly access Player B's inventory and remove the requested item from Player B's inventory. At least part of the one or more operations may be executed by a first specialized portion of the first configuration that includes instructions for performing specialized operations for the first configuration. For example, in some cases, the accessing of Player B's inventory and removing items from the inventory may be executed by server specialized portion 211B of server component configuration 311B, which may include instructions for performing server specialized operations. The first specialized portion may not be included in the second configuration. For example, as shown in FIG. 3B, server specialized portion 211B of server component configuration 311B is not included in client component configuration 312B. At operation 622, results of the one or more operations may be returned to the second configuration. For example, video game server 401 may provide confirmation to client component configuration 312B at client 402B indicating that the requested item has been removed from Player B's inventory. Thus, as described above, the example process of FIG. 6 may allow multiple different deployment contexts of a video game to communicate in order to efficiently perform component-related operations, while at the same time reducing or eliminating the risk of unauthorized or defective actions by each of the deployment contexts.

Figure 7:
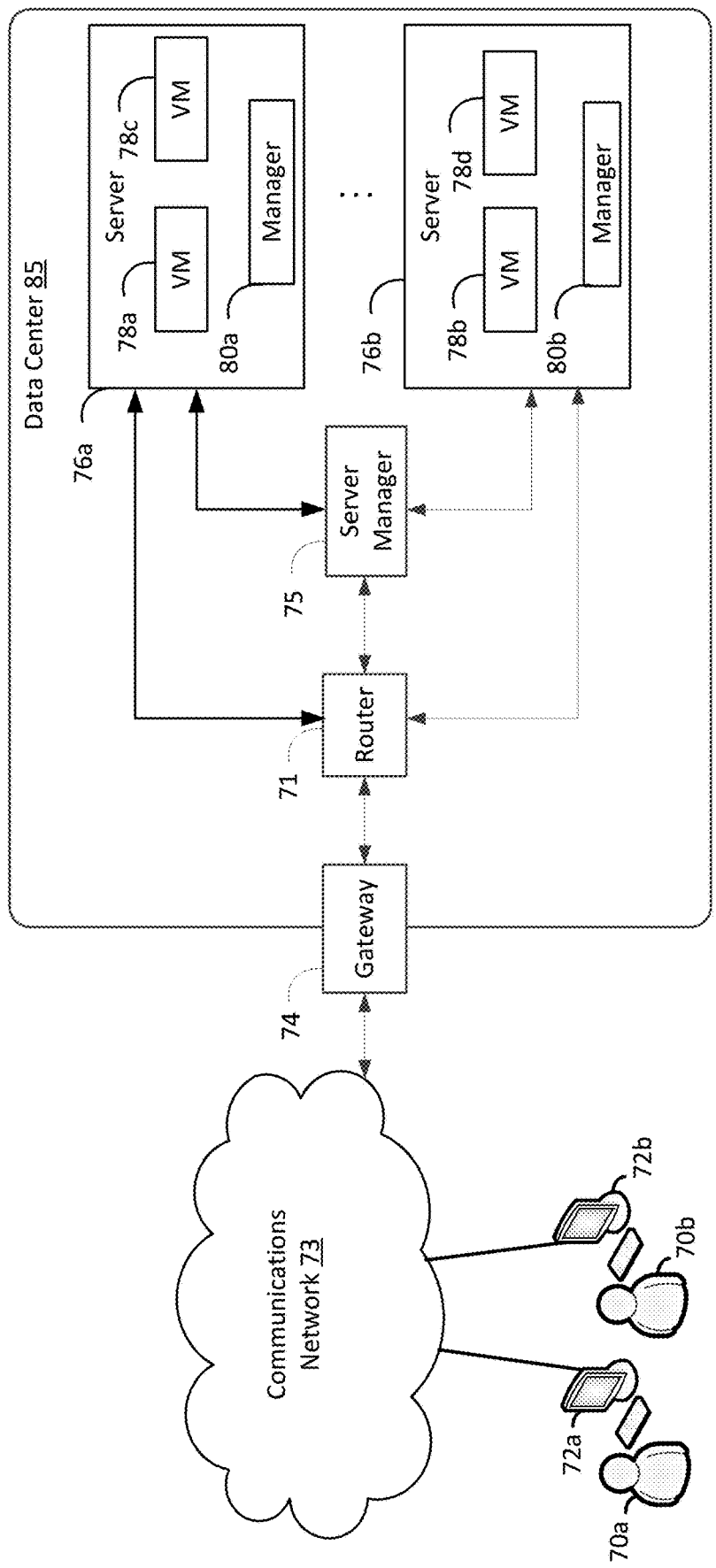
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
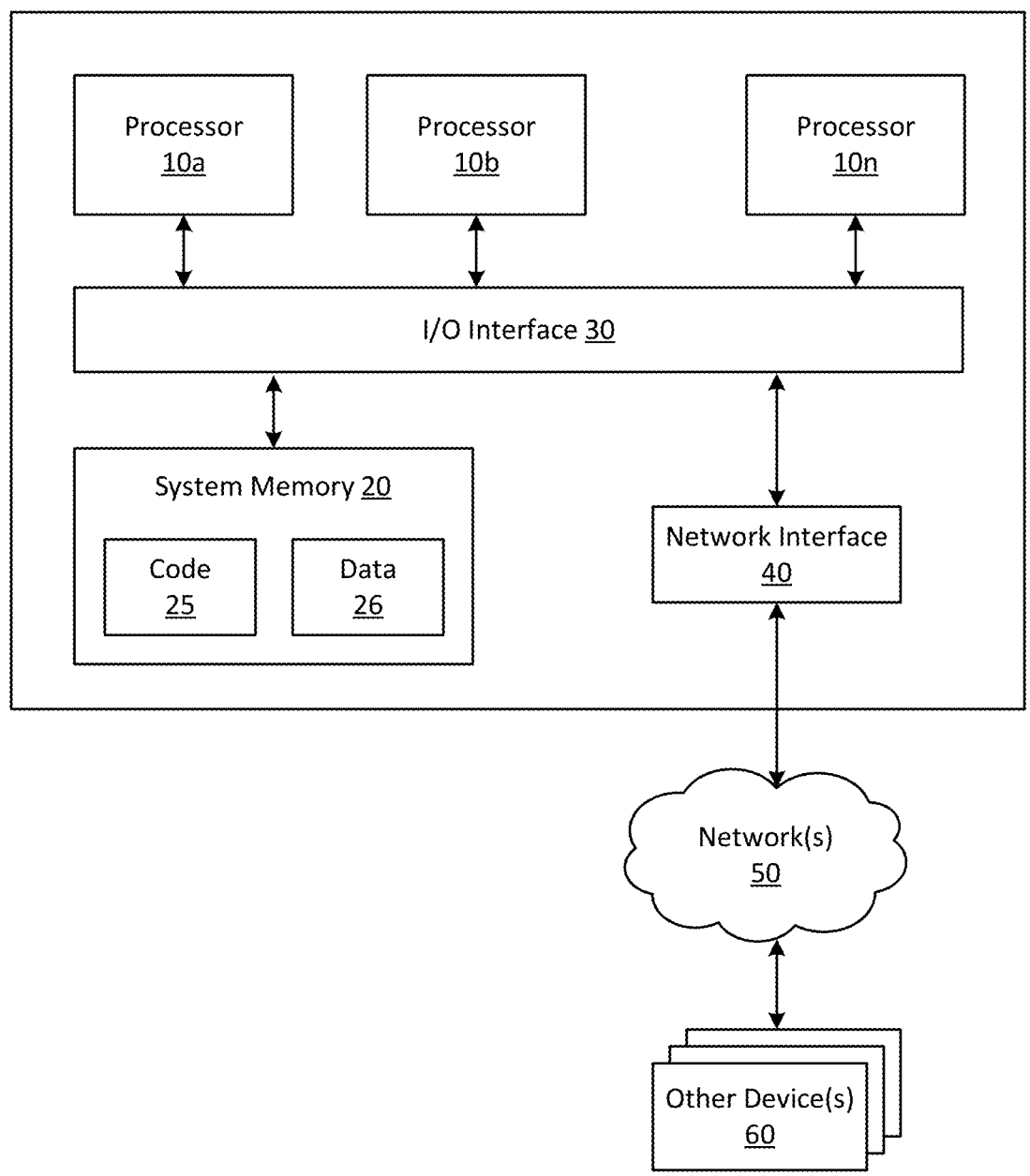
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for implementing a video game comprising:
   one or more processors; and
   one or more memories having stored therein instructions that, upon execution by the one or more processors, cause the computing system to perform acts comprising:
      executing, at a server compute node, a server video game program associated with the video game, the video game including an entity-component architecture comprising an entity that represents an object in a virtual space of the video game, the entity including a component that represents a set of virtual items owned by the object, the server video game program including a server configuration of the component, wherein a client video game program including a client configuration of the component is executed at a client compute node, and wherein the video game is operated by at least the server video game program and the client video game program;

receiving, by the server configuration, instructions associated with a request from the client configuration for execution of one or more operations to add or remove a first virtual item to or from the set of virtual items owned by the object;

executing, by the server configuration, the one or more operations, wherein instructions for performing the one or more operations are included in the server configuration but are not included in the client configuration; and returning results of the one or more operations to the client configuration.

2. The computing system of claim 1, wherein the server configuration and the client configuration are generated based, at least in part, on a configuration definition of the component.

3. The computing system of claim 2, wherein the configuration definition comprises a common portion including instructions for performing operations common to the server configuration and the client configuration, a server specialized portion including instructions for performing specialized operations for the server configuration, and a client specialized portion including instructions for performing specialized operations for the client configuration.

4. The computing system of claim 3, wherein the server configuration comprises the common portion and the server specialized portion, and wherein the client configuration comprises the common portion and the client specialized portion.

5. A computer-implemented method for implementing a video game comprising:

executing, at a first compute node, a first video game program associated with the video game, the video game including an entity-component architecture comprising an entity that represents an object in a virtual space of the video game, the entity including a component that represents a set of virtual items owned by the object, the first video game program including a first configuration of the component, wherein a second video game program including a second configuration of the component is executed at a second compute node, and wherein the video game is operated by at least the first video game program and the second video game program;

receiving, by the first configuration, instructions associated with a request from the second configuration for execution of one or more operations to add or remove a first virtual item to or from the set of virtual items owned by the object;

executing, by the first configuration, the one or more operations, wherein instructions for performing the one or more operations are included in the first configuration but are not included in the second configuration; and returning results of the one or more operations to the second configuration.

6. The computer-implemented method of claim 5, wherein the first compute node is a server compute node and the first configuration is a server configuration of the component, and wherein the second compute node is a client compute node and the second configuration is a client configuration of the component.

7. The computer-implemented method of claim 5, wherein the first configuration and the second configuration are generated based, at least in part, on a configuration definition for the component.

8. The computer-implemented method of claim 7, wherein the configuration definition comprises a common portion including instructions for performing operations common to the first configuration and the second configuration, a first specialized portion including instructions for performing specialized operations for the first configuration, and a second specialized portion including instructions for performing specialized operations for the second configuration.

9. The computer-implemented method of claim 8, wherein the first configuration comprises the common portion and the first specialized portion, and wherein the second configuration comprises the common portion and the second specialized portion.

10. The computer-implemented method of claim 8, wherein the second specialized portion is not included in the first configuration.

11. The computer-implemented method of claim 7, wherein the configuration definition further comprises an editor specialized portion including instructions for performing specialized operations for an editing interface.

12. The computer-implemented method of claim 7, wherein the configuration definition further comprises one or more game console specialized portions each including instructions for performing specialized operations for a respective type of game console.

13. The computer-implemented method of claim 5, wherein the first configuration and the second configuration are exposable in an editing interface.

14. One or more non-transitory computer-readable storage media having stored thereon instructions that, upon execution by one or more computing devices, cause the one or more computing devices to perform acts comprising:

executing, at a first compute node, a first video game program associated with a video game, the video game including an entity-component architecture comprising an entity that represents an object in a virtual space of the video game, the entity including a component that represents a set of virtual items owned by the object, the first video game program including a first configuration of the component, wherein a second video game program including a second configuration of the component is executed at a second compute node, and wherein the video game is operated by at least the first video game program and the second video game program;

receiving, by the first configuration, instructions associated with a request from the second configuration for execution of one or more operations to add or remove a first virtual item to or from the set of virtual items owned by the object;

executing, by the first configuration, the one or more operations, wherein instructions for performing the one or more operations are included in the first configuration but are not included in the second configuration; and returning results of the one or more operations to the second configuration.

15. The one or more non-transitory computer-readable storage media of claim 14, wherein the first compute node is a server compute node and the first configuration is a server configuration of the component, and wherein the second compute node is a client compute node and the second configuration is a client configuration of the component.

16. The one or more non-transitory computer-readable storage media of claim 14, wherein the first configuration and the second configuration are generated based, at least in part, on a configuration definition for the component.

17. The one or more non-transitory computer-readable storage media of claim 16, wherein the configuration definition comprises a common portion including instructions for performing operations common to the first configuration and the second configuration, a first specialized portion including instructions for performing specialized operations for the first configuration, and a second specialized portion including instructions for performing specialized operations for the second configuration.

18. The one or more non-transitory computer-readable storage media of claim 17, wherein the first configuration comprises the common portion and the first specialized portion, and wherein the second configuration comprises the common portion and the second specialized portion.

19. The one or more non-transitory computer-readable storage media of claim 18, wherein the second specialized portion is not included in the first configuration.

20. The one or more non-transitory computer-readable storage media of claim 14, wherein the first configuration and the second configuration are exposable in an editing interface.

* * * * *